United States Patent [19]

Pietrogrande et al.

[11] Patent Number: 5,314,761
[45] Date of Patent: May 24, 1994

[54] PROCESS AND INSTALLATION FOR GENERATING ELECTRICAL ENERGY

[75] Inventors: Paolo Pietrogrande; Francesco Giacobbe, both of Rome, Italy

[73] Assignees: Mannesmann AG, Düsseldorf, Fed. Rep. of Germany; Kinetics Technology International Group B.V., Zoetermeer, Netherlands

[21] Appl. No.: 838,424

[22] PCT Filed: Sep. 5, 1990

[86] PCT No.: PCT/DE90/00687
§ 371 Date: May 6, 1992
§ 102(e) Date: May 6, 1992

[87] PCT Pub. No.: WO91/03844
PCT Pub. Date: Mar. 21, 1991

[30] Foreign Application Priority Data

Sep. 6, 1989 [IT] Italy ............................... 48335 A/89

[51] Int. Cl.$^5$ ............................................ H01M 8/04
[52] U.S. Cl. ........................................ 429/17; 429/19; 429/39
[58] Field of Search ......................... 429/17, 19, 34, 14, 429/16, 20, 21, 38, 39, 34

[56] References Cited

U.S. PATENT DOCUMENTS

| | | | |
|---|---|---|---|
| 4,622,275 | 11/1986 | Noguchi et al. | 429/19 |
| 4,657,828 | 4/1987 | Tajima | 429/17 X |
| 4,670,359 | 6/1987 | Beshty et al. | 429/17 |
| 4,696,871 | 9/1987 | Pinto | 429/17 |
| 4,722,873 | 2/1988 | Matsumura | 429/24 |
| 4,738,903 | 4/1988 | Garow et al. | 429/17 |
| 4,743,516 | 5/1988 | Noguchi et al. | 429/16 |
| 4,759,997 | 7/1988 | Ohyauchi et al. | 429/19 |
| 4,963,443 | 10/1990 | Kamoshita | 429/17 |
| 5,047,298 | 9/1991 | Perry, Jr. et al. | 429/34 X |

*Primary Examiner*—Anthony Skapars
*Attorney, Agent, or Firm*—Nils H. Ljungman & Associates

[57] ABSTRACT

The invention relates to an installation and a process for the generation of electrical energy with a unit for the discharge of $H_2$-rich gas ($H_2$-unit A), with a fuel cell system, whose anode chamber (8a) has a $H_2$-feed line (2) from the $H_2$-unit (A), and with a gas turbine (19) and a combustion chamber (17), and with a compressed air generation unit (10) connected for drive purposes to the gas turbine (19), and is essentially characterized by the fact that the $H_2$-feed line is the only fluid connecting line between the $H_2$-unit (A) on the one hand and the fuel cell system (B) and the compressed air generation unit (C) on the other hand. Thus the compressed gas containing $O_2$ is used exclusively for the feed into the cathode chamber of the fuel cell, and if necessary, is partly used directly for the generation of the combustion gas for the compression drive.

20 Claims, 2 Drawing Sheets

PROCESS AND INSTALLATION FOR GENERATING ELECTRICAL ENERGY

BACKGROUND OF THE INVENTION

1. Field of the Invention

This invention relates to an installation and a process for the generation of electrical energy, whereby fuel cells perform the conversion of energy chemically bonded in a fuel into electrical energy.

2. Background Information

Fuel cells have been part of the prior art for many years. There are a number of different types, which are operated at different pressures, temperatures and with different electrolytes. Examples include alkaline fuel cells (AFC=Aklaline Fuel Cell), phosphoric acid fuel cells (PAFC=Phosphoric Acid Fuel Cell), molten carbonate fuel cells (MCFC=Molten Carbonate Fuel Cell), solid oxide fuel cells (SOFC=Solid Oxide Fuel Cell), or solid polymer electrolyte fuel cells (SPFC=Solid Polymer Electrolyte Fuel Cell). A fuel cell always has an anode chamber and a cathode chamber, between which an electric current flows through an electrolyte. The anode chamber generally contains hydrogen gas or another gas rich in $H_2$ as the fuel, and the cathode chamber contains a gas containing $O_2$ (in particular air) as the oxidizing agent.

An oxidation process then takes place in the fuel cell at a temperature level which is relatively low compared to thermal combustion, for which reason we also speak of the "cold combustion" of the fuel. The efficiency of the fuel cell can generally be increased by increasing the operating pressure. Since its mechanical structure is very sensitive, precautions must be taken so that the pressure of the $H_2$-rich anode gas and the pressure of the cathode gas containing $O_2$ are approximately equal to avoid mechanical damage. There must also be a control system to cool the fuel cell, so that the operating temperature always remains at the required level, independent of current fluctuations. An additional important point which has an effect on the operational safety of a fuel cell system is the maintenance of a sufficient degree of purity of the anode gas. For example, several types of fuel cells are sensitive to CO (e.g. PAFC), while others, such as MCFC or SOFC, are not.

To increase the overall efficiency of the electric current generation by means of fuel cells, and to achieve competitiveness with conventional processes for the generation of electric energy, the generation of the $H_2$-rich gas has heretofore been directly connected to the current generation, since in this manner the energy and fluid flows which occur in the fuel cell process can be utilized in the context of the conversion of a hydrocarbon into an $H_2$-rich gas. That would result in a close integration of the two subsystems, as will be explained below in greater detail on the basis of the schematic diagram in FIG. 1.

The fuel cell system designated B can consist of a single fuel cell, but also of several fuel cells connected together. (In the remainder of this description, the term "fuel cell" is also understood to include the possibility of several fuel cells.) This fuel cell B has two input gas currents, namely one $H_2$-rich anode gas current 2 and a cathode gas current 3 containing 02, which consists, for example, of compressed air. The compressed air, for example, can be supplied by an electrically operated compressor. The fluid currents 2 and 3 are held at the same pressure level by corresponding control devices, to prevent mechanical damage to the fuel cell. Exhaust gases are formed as a result of the chemical/physical processes taking place in the fuel cell. Since the $H_2$ content of the $H_2$-rich gas 2 cannot be completely consumed, the anode exhaust gas current 4 discharged from the anode chamber still contains a residual amount of $H_2$. Depending on the method of operation and the type of fuel cell, the remaining concentration is in the range of approximately 5-30% of the initial amount. The actual value is a function of the gas composition and the fuel consumption in the cell. The cathode exhaust gas current 6 being discharged from the cathode chamber also still contains a portion of the original $O_2$ content of the cathode gas current 3 (frequently approximately one-half). Since during the "cold combustion" of the hydrogen in the fuel cell, a corresponding amount of water is formed, the water can be separated, e.g. by condensation of the cathode exhaust gas (in many fuel cells of the anode exhaust gas, too), in the form of high-purity water. In FIG. 1, the water current recovered is designated 5. Finally, a (fluid current 7 exits the fuel cell B, which is intended to symbolize the removal of heat, i.e. it represents the cooling system of the fuel cell B. Such a cooling system can be configured as an open or as a closed cooling system, in which the heat to be discharged is transferred to another medium. Systems of the prior art generally employ open cooling systems, also using them to generate steam. The cooling water to be used must be very carefully purified (better than standard demineralized boiler water).

Not only is that very expensive, but it frequently does not even achieve the desirable long-term operation of the cooling system, on account of the residual concentration of minerals always left in the water. By means of the fluid currents 4 to 7, the fuel cell system B is integrated into the generation of the $H_2$-rich anode gas, which takes place in the $H_2$-unit A. The $H_2$-unit A works mostly as a steam reformer installation. The raw material introduced into the reformer installation is a current of gaseous hydrocarbons 1 which is saturated with steam. At least some of the water 5 recovered from the waste gas of the fuel cell A can be used for that purpose. The heat which is given off during the cooling of the fuel cell B can be used to convert the water into the steam phase, and to superheat the steam. The $H_2$ content (and the other combustible components such as CO and hydrocarbons) in the anode exhaust gas current 4 and the $O_2$ content of the cathode exhaust gas current 6 are frequently used for combustion, to at least partly supply the heat requirement of an indirectly heated reformer in the $H_2$ unit A, since the steam reforming process is strongly endothermal. Since the operating pressure of the fuel cell B is normally relatively high (approximately 2-10 bar), the steam reforming and frequently also the combustion for the indirect heating of the reformer are performed at correspondingly high pressures. On account of the refractory materials required, the costs for the fabrication of the steam reforming system are particularly high, and there are also increased safety problems.

The diagram in FIG. 1 is very rough and does not show any details. For example, it does not show that the product gas generated in the $H_2$-unit A, before it is introduced into the fuel cell B, is cooled and has generally been subjected to a prior $CO/H_2$ shift treatment. The heat which is thereby given off is also used to heat the input fluid currents of the steam reforming process.

FIG. 1 shows the high degree of interconnection between the H₂unit A and the fuel cell system B. It shows that operating fluctuations of the one unit have direct effects on the other unit. While the electrochemical process in the fuel cell B can be influenced very quickly (practically instantly), the subsystem for the generation of an H₂-rich gas (H₂unit A) reacts to corresponding interventions very slowly (on the order of several minutes). For this reason, the startup phase and adjustments to different loads on the electricity discharge side present major problems, from the point of view of control and regulation. In spite of a great deal of effort and expense, the prior art has not been able to solve these problems, or to achieve satisfactory values for the duration of normal operation. On the 80 or so systems which have been constructed worldwide, the duration of problem-free operation is only several thousand hours, or even significantly less than that. Only very small systems have been able to operate for up to 20,000 hours. But the market requires a minimum operating time of 100,000 h and more.

The generic GB-A-21 82 195 discloses a process for electricity generation by means of fuel cells, in which, in comparison to the prior art illustrated in FIG. 1, the subsystems for the generation of the H₂-rich gas and the fuel cell are no longer so closely interwoven with one another, whereby the combustion exhaust gas generated is not used to heat an indirectly fired steam reformer unit, but is discharged to a gas turbine. This gas turbine drives a compressor which supplies the compressed air for the operation of the fuel cell, and if necessary, also for the performance of the catalytic combustion.

An additional important task for the pneumatic compressor is the supply of the steam reformer unit with combustion compressed air. In this process, a special reformer is used which contains a primary reformer stage and a secondary reformer stage. Between the two stages, a partial combustion takes place for heating in the product gas already produced, the oxygen for which must be supplied by the compressed air compressor.

With fuel cell systems of the prior art employing indirectly heated steam reformer units, the combustion for the indirect heating also frequently takes place under elevated pressure, so that the combustion air must be supplied in the form of compressed air.

An additional characteristic of the process disclosed in GB-A-21 82 195 is that the compressed air required for the combustion in the steam reformer—in a variant of the process and following saturation with steam—is preheated by the hot flue gases generated by the catalytic combustion of the exhaust gases of the fuel cell. The recovery of water from the cooled flue gases from the catalytic combustion for use as the raw material for the steam reforming is described only as a possible variant of the process. In summary, therefore, we find that between the system for the generation of a H₂-rich gas and the fuel cell system, in this process there are three additional fluid currents, namely the H₂feed current to the fuel cell, the compressed air current to the steam reformer and the heat current.(if the latter is also included as a "fluid current" in the broader sense). Thus, as before, there is a strong interdependence between the subsystems indicated above, so that the existing problems of control and regulation have still not been solved. The construction of the steam reformer remains complex and expensive since, like the entire system, it must be designed for the operating pressure of the fuel cell.

OBJECT OF THE INVENTION

The object of the invention is therefore to improve an installation for the generation of electrical energy with a unit for the discharge of H₂-rich gas, with a fuel cell system, whose anode chamber has a H₂-feed line from the H₂-unit, also with a gas turbine and a combustion chamber, in particular a combustion chamber for a catalytic combustion, which has both a gas feed line from the anode chamber and a gas feed line to the cathode chamber of the fuel cell system, and whose combustion gas output leads via an exhaust gas line to the input of the gas turbine, and wit a compressed air generation unit coupled for drive purposes to the gas turbine, where the compressed air output of the compressed air generation unit is connected by means of a compressed air line to the cathode chamber of the fuel cell system; and an additional object of the invention is to improve a process for the generation of electrical energy, whereby a H₂-rich gas is introduced into the anode chamber of a fuel cell, and a gas containing O₂, in particular air, is introduced into the cathode chamber of the fuel cell, both at approximately the same pressure, and whereby the exhaust gas currents generated by the fuel cell (anode exhaust gas and cathode exhaust gas) are submitted to a combustion, in particular a catalytic combustion, and the combustion gas thereby generated is used as a drive energy source for the compression of the gas containing O₂, so that the disadvantages indicated above are eliminated.

SUMMARY OF THE INVENTION

This object is achieved by the invention in the form of an installation characterized by the fact that the H₂-feed line is the only fluid connection line between the H₂-unit on the one hand and the fuel cell system and the compressed air generation unit on the other hand. In addition this object is achieved by a process characterized by the fact that the compressed O₂ gas is used exclusively for the feed into the cathode chamber of the fuel cell and, if necessary, can be partly used directly for the generation of the combustion gas for the compression drive.

BRIEF DESCRIPTION OF THE DRAWINGS

The invention is explained in greater detail with reference to the accompanying FIGS. 1 to 3, in which parts having the same function, are identified by the same reference numbers.

DESCRIPTION OF THE PREFERRED EMBODIMENTS

Figure 1:
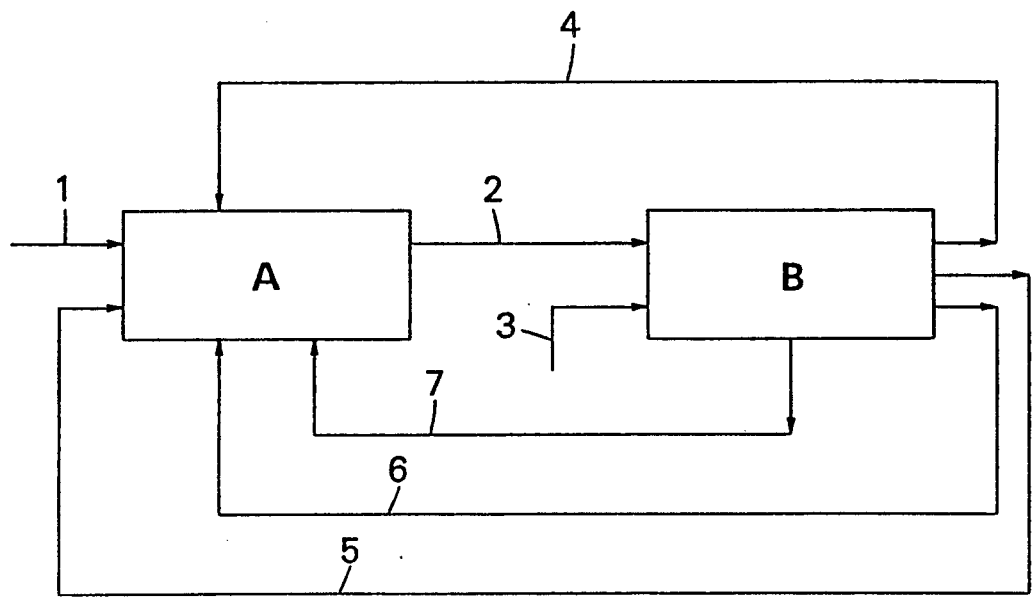
FIG. 1 shows a diagram of an electricity generation system of the prior art.
Figure 2:
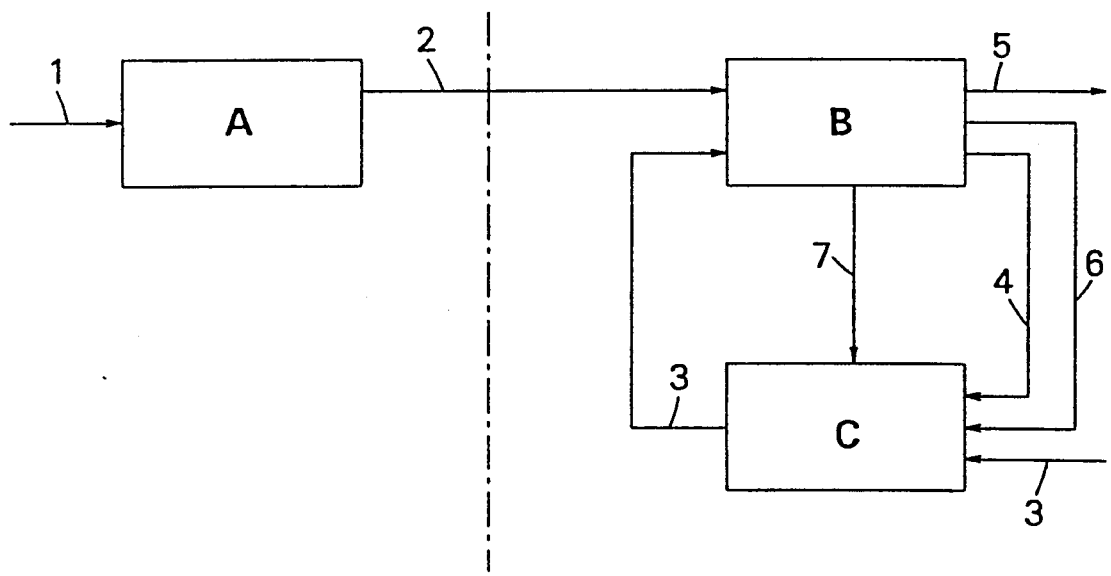
FIG. 2 shows a schematic diagram of the invention.

As explained in detail above, FIG. 1 shows the conventional high degree of process integration for H₂ generation and the fuel cell system. In contrast, even the rough diagram of the invention in FIG. 2 shows that this integration is held to a minimum. The connection between the H₂ unit and the fuel system B, including the compressed air generation system C, consists only of the essential supply line for the H₂-rich anode gas current 2. All the other connections between these two subsystems A and B/C have been eliminated.

That means that the $H_2$ unit A, in one variant of the invention, can consist only of a reservoir for $H_2$ or a $H_2$-rich gas, or simply of a corresponding hydrogen supply line, and the hydrogen necessary for the fuel cell B can be generated completely independently of the operation of fuel cell B, i.e. even at a different location. But it is frequently advantageous to generate the required hydrogen, corresponding to the $H_2$ requirement of fuel cell B, in the immediate vicinity of the latter. But in that case, adjustments of the $H_2$ generation can be made comparatively easily, since the $H_2$ unit according to the invention, from a process technology and control point of view, can be operated largely independently of the fuel cell B. It is essential that the anode exhaust gas current 4 and the cathode exhaust gas current 6 are designed for preferably catalytic combustion in a combustion chamber, and that the combustion exhaust gas thereby generated is used to drive the compressed air generator unit C. Unlike the installations of the prior art, therefore, it is not used to preheat any process media which are used for $H_2$ generation. It is a simple matter to use closed and therefore less sensitive cooling systems to cool the fuel cell B, since the fuel cell B need no longer be used to generate steam for the $H_2$ unit.

The waste heat current 7 can be used, for example, to preheat the compressed air current 3 for the fuel cell B, or to preheat the compressed air which is used as necessary for the catalytic combustion of the anode exhaust gas. The water portion, designated 5, contained in the exhaust gas of the fuel cell system B, is not in itself needed any longer, but can be discharged with the exhaust gas from the catalytic combustion. The water portion, however, can also be condensed and used for other purposes outside the system. The waste heat occurring in subsystems A and B can also be used, if necessary, for heating purposes outside the system according to the invention, without thereby adversely affecting the complete separation of subsystems A and B.

An installation according to the invention is explained in greater detail below, with reference to the embodiment schematically illustrated in FIG. 3. The installation essentially consists of the systems $H_2$-unit A, fuel cell system B (with fuel cell 8), and compressed air generation unit C. In the accompanying figure, the systems A and C are set off by frames of dotted lines. Basically, any desired type of $H_2$-feed system can be used for the fuel cell 8. In the event that the pressure of the $H_2$-unit A is lower than the specified operating pressure of the fuel cell 8, in one refinement of the invention there is a $H_2$-compressor 16 (shown in dotted lines) in the $H_2$-supply line 2 to the anode chamber 8a of the fuel cell 8. The preferred embodiment is the one illustrated in FIG. 3, in which the $H_2$-unit is designed as a steam reformer installation By means of a line, a current 1 of gaseous hydrocarbons such as natural gas or biogas is introduced into the reformer installation. A partial current 1a of these hydrocarbons reaches a saturator 10, in which it is saturated with steam.

Preferably, a saturator 10 like the one disclosed in the present applicant's AP 0 320 440 A2 is used for this purpose. The lower half of this saturator 10, the hydrocarbon gas introduced in countercurrent to a water current supplied by means of the water feed line 14 and runs downward, e.g. over dripping or trickling bodies (e.g. Raschig rings), is brought into contact with liquid water. In this lower portion, the saturator is indirectly heated by the latent heat contained in the product gas ($H_2$-rich gas) produced. For this purpose, the product gas is transported via the line 2c into a heat exchanger located in the lower half of the saturator 10. The steam required for the saturation of the gaseous hydrocarbon is therefore not supplied from outside, but originates directly in the saturator 10 itself. After saturation is reached, the hydrocarbon/steam mixture is heated further in the upper portion of the saturator 10, so that it can be introduced into the reformer 9.

This additional heating again occurs indirectly with the latent heat of the product gas current, which comes directly from the reformer 9 via the line 2a, and once again is placed in countercurrent to the hydrocarbon/steam mixture. The product gas current leaves the heat exchanger located in the upper portion of the saturator 10 via the line 2b, which leads to a $CO/H_2$-shift reactor 11. Of course, as is frequently customary, the shift reactor 11 can also consist of two or more units connected in series, with interposed heat exchangers to cool the product gas. In the shift reactor 11, the $H_2$-content of the product gas is increased in an exothermal reaction, and the CO concentration is correspondingly reduced. The temperature increase in the product gas which occurs in the shift reactor 11 promotes the generation of the hydrocarbon/steam mixture in the lower portion of the saturator.

The hydrocarbon/steam mixture brought to the preheating temperature travels via the line 15 out of the saturator 10 into the reaction chamber of the reformer 9, which is preferably heated indirectly, but which can also be heated directly. For this purpose, for example, a partial current 1b of the supplied gas current 1 is burned in the combustion chamber of the reformer 9, with the addition of a combustion air current 12. This combustion preferably takes place under atmospheric conditions, so that no compressed air feed is necessary for the purpose. The exhaust gas current from the combustion chamber is designated 13, and can be used, for example, to preheat the water 14 being fed into the saturator and/or to preheat the combustion air current 12. The possibility of the practically unpressurized combustion contributes to the reduction of the manufacturing costs of the reformer 9 and the other parts of the $H_2$-unit A. In addition, the steam reforming itself can take place practically unpressurized or at low pressures (e.g. 1-5 bar), since if necessary, the $H_2$-compressor 16 can bring the current of the $H_2$-rich gas to the specified operating pressure of the fuel cell 8. On the other hand, in the processes of the prior art, the steam reforming must always take place at a relatively high pressure, to achieve the operating pressure of the fuel cell B. The maximum independence of the $H_2$-unit A from the fuel cell system B is thereby improved, if in the normal operating case, there is a line 2d closed by a valve which allows the temporary introduction of the $H_2$-rich gas generated into the healing space of the reformer 9. It is thereby easily possible to start up the reformer from the cold state, or to temporarily operate it in a standby mode with a minimum production capacity, without having to discharge the hydrogen produced from the fuel cell 8.

While the anode chamber 8a of the fuel cell 8 is supplied with the $H_2$-rich anode gas current via the line 2, the cathode chamber 8b receives the required amount of gas containing $O_2$ in the form of compressed air via the line 3. In the illustrated embodiment, there is preferably a compressed air reservoir 21 included in the compressed air line 3, which is equipped with a pressure relief valve, and temporarily stores the compressed air compressed in a compressor 20, so that compressed air can be available even if the compressor 20 is not working, or is not working at sufficient capacity, for any reason. The compressor 20, which is preferably designed as a turbo compressor and can also have several stages, takes in the fresh air via the line 3a, and is connected for drive purposes to a gas turbine 19. This gas turbine 19 is operated with the combustion exhaust gases generated in a combustion chamber 17, preferably by catalytic combustion. These combustion exhaust gases are transported via the line 18 and, following their decompression, are discharged once again via the line 18a. In the combustion chamber 17, in normal operation, the current of anode exhaust gas arriving via the lines 4 and 6 from the fuel cell 8 and containing a residual $H_2$-concentration, generally along with additional combustible components such as CO and non-reformed hydrocarbons, and the current of cathode exhaust gas, which has a residual oxygen content, are burned together.

In the event that the $O_2$-concentration is not high enough for complete combustion, in one refinement of the invention compressed air can also be extracted from the compressed air reservoir 21 via a line 23 which can be closed by a valve, and transported into the combustion chamber 17. The invention makes no provision for the use of the compressed air generated to operate the $H_2$-unit A.

It is advantageous to also have a line 22 which can be closed by a valve, and through which an additional combustible gas (e.g. natural gas or biogas) can be introduced into the combustion chamber 17, independently of the anode exhaust gas current. In that manner, the operation of the combustion chamber 17 and of the turbine/compressor system 19, 20 is also possible, independently of the operation of the fuel cell 8. Exhaust gas turbochargers like those used in automobile engines are particularly suited for use in the compressed air generation system C.

As a rule, the fuel cell 8 is operated so that the residual concentration of $H_2$, together with any other combustible components of the anode exhaust gas which may be present, is sufficient to release just enough heat during the combustion in the combustion chamber 17 so that it is sufficient for the gas turbine 19 to produce the required amount of compressed air.

Figure 3:
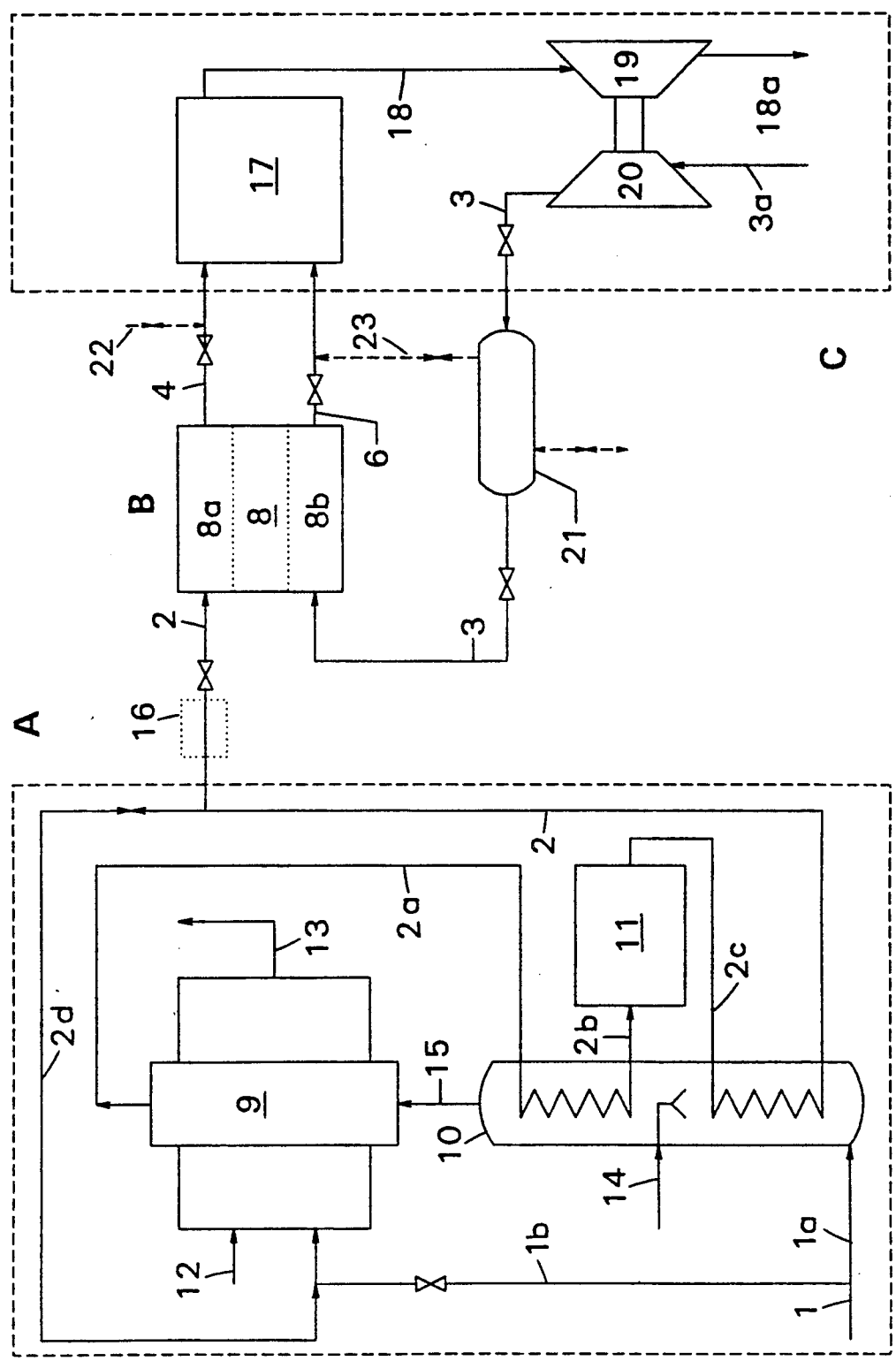
FIG. 3 shows one embodiment of a system configuration according to the invention.

The cooling of the fuel cell 8, which is not indicated in detail in FIG. 3, can be accomplished, for example, by means of a closed circuit cooling, since the efficiency of the cooling is not of primary importance with regard to the recovery of the discharged heat (e.g. steam generation), since the preferential system used as the $H_2$-unit for $H_2$-generation requires no process steam at all introduced from the outside, but works with liquid water in the saturator 10.

The requirements for the purity of this water are significantly lower than the requirements for the cooling water of the fuel cells in processes of the prior art, in which this cooling water is converted directly into steam (open cooling system), and for which the steam reforming must be used in the context of the $H_2$-generation. In closed cooling systems, the temperature difference in the heat exchanger would not have been sufficient for an efficient steam generation.

In the present invention, the waste heat from the fuel cell 8, however, can be advantageously used to preheat the compressed air current supplied through the line 3 to the fuel cell 8, or the compressed air current, if any, fed to the combustion chamber 17.

In the context of the invention, the fuel cell 8 can basically be any type of fuel cell. Preferably however, types AFC, SPFC and in particular PAFC are suitable, since they work at relatively low temperatures below 200° C.). High temperature fuel cells such as MCFC and SOFC can also be used for the execution of the invention, but they are less appropriate. The operating pressure of the fuel well should be kept in the range of 1-10 bar, preferably in the range of 3-8 bar, since on the one hand this makes possible a good yield in terms of electricity generation, and on the other hand does not set any particularly high requirements for the strength properties of the mechanical components of the facility. In addition, the pressure of the $H_2$-unit can be lower, since according to the invention, an $H_2$-compressor can be interposed. Together with the significantly simplified control and regulation technology as a result of the fact that the principal aggregates of the unit can be operated completely independently of one another, this significantly reduces the total costs compared to conventional facilities, which are extremely difficult to operate on account of the high degree of integration of the principal aggregates. As an additional important advantage, the invention simultaneously achieves a significant improvement in terms of the operating safety and availability of the facility. Not only is it possible to easily control the startup of the entire facility, during which the principal aggregates can be placed in operation independently of the fuel cell system, but the reaction to load fluctuations in the current consumption can also be easily controlled, on account of the process separation of the principal aggregates.

The technical data of a 200 kW installation according to the invention, which works with PAFC type fuel cells and corresponds approximately to the installation diagram in FIG. 3, are as follows:

| Feed | Methane or biogas |
|---|---|
| Rated electrical power | 180 kW |
| Thermal power | 210 kW |
| Guaranteed electrical efficiency | 40% (lower calorific value) |
| Operating range | 40%–100% |
| Load change from 40% to 100% | in 10 minutes |
| Natural gas consumption | 387,000 kcal/h |

The installation according to the invention is characterized by a compact construction which occupies little space:

| Steam reformer installation | 6.0 × 2.5 × 5.0 m |
|---|---|
| Fuel cell | 2.5 × 2.5 × 3.0 m |
| Turbocompressor | 2.5 × 2.5 × 1.0 m |

One aspect of the invention resides broadly in an installation for the generation of electrical energy with a unit for the discharge of $H_2$-rich gas ($H_2$-unit A), with a fuel cell system B, whose anode chamber 8a has a $H_2$-feed line 2 form the $H_2$-unit A, also with a gas turbine 19 and a combustion chamber 17, in particular a combustion chamber for a catalytic combustion, which has both a gas feed line 4 from the anode chamber 8a and a gas feed line 6 to the cathode chamber 8b of the fuel cell system B, and whose combustion gas output leads via an exhaust gas line 18 to the input of the gas turbine 19, and with a compressed air generation unit C coupled for drive purpose to the gas turbine 19, where the compressed air output of the compressed air generation unit C is connected by means of a compressed air line 3 to the cathode chamber 8b of the fuel cell system B, characterized by the fact; that the $H_2$-feed line 2 is the only fluid connection line between the $H_2$-unit A on the one hand and the fuel cell system B and the compressed air generation unit C on the other hand.

Another aspect of the invention resides broadly in an installation characterized by the fact that a compressed air reservoir 21 with a pressure relief control is incorporated into the compressed air line 3.

Yet another aspect of the invention resides broadly in an installation characterized by the fact that the combustion chamber 17 has a feed line 22 for a combustion gas which is independent of the fuel cell system B and can be shut off.

A further aspect of the invention resides broadly in an installation characterized by the fact that the combustion chamber 17 has a feed line 23, which can be shut off, for compressed air from the compressed air reservoir 21.

A yet further aspect of the invention resides broadly in an installation characterized by the fact that the $H_2$-unit A is designed as an installation for the steam reforming of hydrocarbons.

Yet another further aspect of the invention reside broadly in an installation characterized by the fact that the installation for the steam reforming has a directly or indirectly heated reformer 9, at least one shift reactor 11 for the additional generation of $H_2$ at the expense of the CO concentration in the product gas which can be generated by vapor reforming, and a saturator 10 which can be indirectly heated by the latent heat of the product gas and can be charged with water and gaseous hydrocarbons, and from which, by means of a line 15, a preheated hydrocarbon/steam mixture can be transported to the reformer 9.

An additional aspect of the invention resides broadly in an installation characterized by the fact that a hydrogen reservoir is used as the $H_2$-unit A.

A yet additional aspect of the invention resides broadly in an installation characterized by the fact that an $H_2$-compressor 16 is incorporated into the $H_2$ feed line 2.

A further additional aspect of the invention resides broadly in a process for the generation of electrical energy, whereby a $H_2$-rich gas is introduced into the anode chamber of a fuel cell, and a gas containing $O_2$, in particular air, is introduced into the cathode chamber of the fuel cell, both at approximately the same pressure, and whereby the exhaust gas currents generated by the fuel cell (anode exhaust gas and cathode exhaust gas) are submitted to a combustion, in particular a catalytic combustion, and the combustion gas thereby generated is used as a drive energy source for the compression of the gas containing $O_2$, characterized by the fact that the compressed $O_2$ gas is used exclusively for the feed into the cathode chamber of the fuel cell and, if necessary, can be partly used directly for the generation of the combustion gas for the compression drive.

A yet further additional aspect of the invention resides broadly in a process characterized by the fact that the fuel cell is operated so that the residual concentration of $H_2$ in the anode exhaust gas remains at a level at which, by means of the combustion of the anode exhaust gas, there is on average enough remaining drive energy for the compression of the gas containing $O_2$ in the fuel cell and required for the combustion.

Another further additional aspect of the invention resides broadly in a process characterized by the fact that there is a buffer storage of the compressed gas containing $O_2$.

A yet another additional aspect of the invention resides broadly in a process characterized by the fact that when the process is started up, as long as the fuel cell is not delivering any or an insufficient quantity of anode exhaust gas, an additional combustible gas other than the $H_2$-rich gas is temporarily used for the combustion.

Another yet further aspect of the invention resides broadly in a process characterized by the fact that the $H_2$-rich gas is generated by steam reforming of a hydrocarbon, in particular of natural gas or biogas, whereby for the generation of the preheated mixture of hydrocarbons necessary of the vapor reforming, a saturator is used which is indirectly heated by the product gas generated during the steam reforming and a subsequent $CO/H_2$-shift treatment, and in which the hydrocarbons are placed in direct contact with still liquid water, which has been preheated if necessary.

A still further aspect of the invention resides broadly in a process characterized by the fact that the steam reforming takes place in an indirectly heated reformer, whereby for heating, the combustion gases from a second combustion of hydrocarbons are used, which takes place under atmospheric conditions or at a slight overpressure.

A still further additional aspect of the invention resides broadly in a process characterized by the fact that the vapor reforming is performed at low pressure, in particular below 3 bar, in the reformer.

Another still further aspect of the invention resides broadly in a process characterized by the fact that the $H_2$-rich gas generated is compressed after the steam reforming to the specified operating pressure of the fuel cell.

Yet another still further additional aspect of the invention resides broadly in a process characterized by the fact that the operating pressure in the fuel cell is limited to a maximum of 10 bar, in particular to a maximum of 3–8 bar.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings in their entirety, including all dimensions, proportions and/or shapes in at least one embodiment of the invention, are accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. Installation for generating electrical energy, said installation comprising:
    a fuel cell system for generating electrical energy, said fuel cell system having an anode chamber and a cathode chamber;
    said fuel cell system being configured for operation at a temperature under 200 degrees Celsius;
    means for providing a gas containing oxygen;
    means for feeding the gas containing oxygen to said cathode chamber;
    means for providing a gas containing hydrogen;
    means for feeding the gas containing hydrogen from said means for providing a gas containing hydrogen to said anode chamber, said means for feeding the gas containing hydrogen being the only means in the electrical energy generation for providing fluid flow between said means for providing a gas containing hydrogen and said fuel cell system; and
    said installation having no means in the electrical energy generation of providing fluid flow between said means for providing a gas containing hydrogen and said means for providing a gas containing oxygen.

2. The installation of claim 1, wherein:
    said means for providing a gas containing oxygen is a compressed air generation unit; and
    said installation comprises:
    a combustion chamber for combusting anode chamber exhaust gas and cathode chamber exhaust gas;
    means for feeding anode chamber exhaust gas into said combustion chamber;
    means for feeding cathode chamber exhaust gas into said combustion chamber;
    a gas turbine being coupled to said combustion chamber for being driven by combustion chamber exhaust gas, said gas turbine being coupled to said compressed air generation unit, said gas turbine being coupled to drive said compressed air generation unit; and
    a combustion chamber exhaust gas means for feeding combustion chamber exhaust gas into said gas turbine for driving said gas turbine.

3. Installation according to claim 2, wherein said combustion chamber is designed for catalytic combustion.

4. Installation according to claim 3, wherein said installation is configured so that the combustion chamber exhaust gas is used exclusively to drive said compressed air generation unit.

5. Installation according to claim 4, wherein:
    said means for feeding the as containing oxygen is a compressed air line; and
    a compressed air reservoir with a pressure relief control is incorporated into the compressed air line.

6. Installation according to claim 5, wherein the combustion chamber has a feed line for a combustion gas which is independent of the fuel cell system and can be shut off.

7. Installation according to claim 6, wherein the combustion chamber has a feed line, which can be shut off, for compressed air from the compressed air reservoir.

8. Installation according to claim 7, wherein said means for providing a gas containing hydrogen is designed as an installation for the steam reforming of hydrocarbons.

9. Installation according to claim 8, wherein the installation for the steam reforming of hydrocarbons comprises:
    a steam reformer;
    means for heating said stem reformer;
    at least one shift reactor for the additional generation of hydrogen at the expense of the carbon monoxide concentration in the product gas containing hydrogen which can be generated by vapor reforming;
    a saturator which is configured to be indirectly heated by the latent heat of the product gas containing hydrogen and said saturator is configured to be charged with water and gaseous hydrocarbons; and a line configured to transport a preheated hydrocarbon/steam mixture from said saturator to the steam reformer.

10. Installation according to claim 9, wherein:
    said means for providing a gas containing hydrogen comprises a hydrogen gas feed line; and
    a gas compressor is incorporated into the hydrogen gas feed line.

11. Installation according to claim 10, wherein said means for heating said steam reformer comprises means for burning hydrocarbons at substantially atmospheric pressure.

12. Installation according to claim 11, wherein said steam reformer is configured to operate at substantially a pressure below 3 bar.

13. Installation according to claim 12, wherein said fuel cell system is configured to operate at substantially a maximum pressure of 10 bar.

14. Installation according to claim 13, wherein said fuel cell system comprises at least one of:
    alkaline fuel cells,
    phosphoric acid fuel cells, and
    solid polymer electrolyte fuel cells.

15. Process for generating electrical energy, said process comprising the steps of:
    generating electrical energy with a fuel cell system, said fuel cell system having an anode chamber and a cathode chamber;
    operating said fuel cell system at a temperature under 200 degrees Celsius;
    providing a gas containing oxygen from a means for providing a gas containing oxygen;
    feeding the gas containing oxygen to said cathode chamber;
    providing a gas containing hydrogen from a means for providing a gas containing hydrogen;
    feeding the gas containing hydrogen from said means for providing a gas containing hydrogen to said anode chamber;
    providing no other fluid flow, for participating in the generating of electrical energy, between said means for providing a gas containing hydrogen and said fuel cell system; and
    providing no fluid flow, for participating in the generating of electrical energy, between said means for providing a gas containing hydrogen and said means for providing a gas containing oxygen.

16. Process according to claim 15, comprising the steps of:
    combusting the exhaust gases of said anode chamber and said cathode chamber in a combustion chamber to produce a combustion exhaust gas;
    compressing air with the drive force of said combustion exhaust gas for providing said gas containing oxygen; and using the combustion exhaust gas to exclusively compress air.

17. Process according to claim 16, comprising the step of:
   storing the compressed air in a reservoir; and
   combusting the compressed air and a combustible gas in said combustion chamber, which combustible gas is other than the exhaust gas from aid anode cell.

18. Process according to claim 17, wherein said means for providing a gas containing hydrogen is designed as an installation of the steam reforming of hydrocarbons, said installation comprises:
   a steam reformer;
   means for heating said reformer;
   at least one shift reactor for the additional generation of hydrogen at the expense of the carbon monoxide concentration in the product gas which can be generated by vapor reforming;
   a saturator which is configured to be indirectly heated by the latent heat of ht product gas containing hydrogen and said saturator is configured to be charged with water and gaseous hydrocarbons; and
   a line configured to transport a preheated hydrocarbon/steam mixture from said saturator to said steam reformer.

19. Process according to claim 18, comprising the steps of:
   compressing said gas containing hydrogen before feeding said gas containing hydrogen to said anode chamber;
   heating said steam reformer with said means for heating said reformer by combusting hydrocarbons at substantially atmospheric conditions;
   operating the steam reformer substantially at a pressure less than 3 bar;
   operating the fuel cell substantially at a pressure less than 10 bar;
   catalytically combusting said the exhaust gases in said combustion chamber; and
   generating electrical energy with at least one of the following:
      alkaline fuel cells,
      phosphoric acid fuel cells, and
      solid polymer electrolyte fuel cells.

20. An installation for generating electrical energy, said installation being configured for performing a process of generating electrical energy, said process comprising the steps of:
   generating electrical energy with said fuel cell system;
   operating said fuel cell system at a temperature under 200 degrees Celsius; providing a gas containing oxygen from said means for providing a gas containing oxygen; feeding the gas containing oxygen through said means for feeding a gas containing oxygen to said cathode chamber; providing a gas containing hydrogen from said means for providing a gas containing hydrogen;
   feeding the gas containing hydrogen from said means for providing a gas containing hydrogen through said means for feeding a gas containing hydrogen to said anode chamber; providing no other fluid flow, for participating in the generating of electrical energy, between said means for providing a gas containing hydrogen and said fuel cell system; and providing no fluid flow, for participating in the generating of electrical energy, between said means for providing a gas containing hydrogen and said means for providing a gas containing oxygen, wherein:
   said installation comprises:
      a fuel cell system for generating electrical energy, said fuel cell system having an anode chamber and a cathode chamber;
      said fuel cell system being configured for operation at a temperature under 200 degrees Celsius;
      means for providing a gas containing oxygen;
      means for feeding the gas containing oxygen to said cathode chamber;
      means for providing a gas containing hydrogen;
      means for feeding the gas containing hydrogen from said means for providing a gas containing hydrogen to said anode chamber, said means for feeding the gas containing hydrogen being the only means in the electrical energy generation for providing fluid flow between said means for providing a gas containing hydrogen and said fuel cell system; and
      said installation having no means in the electrical energy generation for providing fluid flow between said means for providing a gas containing hydrogen and said means for providing a gas containing oxygen.

* * * * *

UNITED STATES PATENT AND TRADEMARK OFFICE
CERTIFICATE OF CORRECTION

PATENT NO. : 5,314,761
DATED : May 24, 1994
INVENTOR(S) : Paolo PIETROGRANDE and Francesco GIACOBBE It is certified that error appears in the above-indentified patent and that said Letters Patent is hereby corrected as shown below:

In column 4, line 15, after 'and', delete "wit" and insert --with--.

In column 8, line 62, after '2', delete "form" and insert --from--.

In column 11, line 51, Claim 5, after 'the', delete "as" and insert --gas--.

In column 12, line 4, Claim 9, after 'said', delete "stem" and insert --steam--.

In column 13, line 8, Claim 17, after 'from', delete "aid" and insert --said--.

In column 13, line 21, Claim 18, after 'of', delete "ht" and insert --the--.

Signed and Sealed this

Nineteenth Day of November, 1996

Attest:

BRUCE LEHMAN

*Attesting Officer*  *Commissioner of Patents and Trademarks*